(12) United States Patent
Lewis

(10) Patent No.: US 7,953,637 B2
(45) Date of Patent: May 31, 2011

(54) METHOD AND APPARATUS FOR MEDIA BUYING

(75) Inventor: Stuart Charles Lewis, South Auckland (NZ)

(73) Assignee: Schel Software Limited, Auckland (NZ)

( * ) Notice: Subject to any disclaimer, the term of this patent is extended or adjusted under 35 U.S.C. 154(b) by 1419 days.

(21) Appl. No.: 10/567,770

(22) PCT Filed: Aug. 12, 2004

(86) PCT No.: PCT/NZ2004/000183
§ 371 (c)(1),
(2), (4) Date: Feb. 10, 2006

(87) PCT Pub. No.: WO2005/015469
PCT Pub. Date: Feb. 17, 2005

(65) Prior Publication Data
US 2006/0293974 A1    Dec. 28, 2006

(30) Foreign Application Priority Data
Aug. 12, 2003   (NZ) .......................... 527578

(51) Int. Cl.
*G06Q 30/00*    (2006.01)
(52) U.S. Cl. ............................... 705/26; 705/37; 705/14
(58) Field of Classification Search .................... 705/14, 705/26, 37
See application file for complete search history.

(56) References Cited

U.S. PATENT DOCUMENTS

| 6,287,005 B1 * | 9/2001 | Teramachi ..................... 384/44 |
| 6,338,043 B1 | 1/2002 | Miller |
| 2001/0020236 A1 | 9/2001 | Cannon |
| 2003/0105660 A1 | 6/2003 | Walsh et al. |
| 2003/0229536 A1 | 12/2003 | House et al. |

FOREIGN PATENT DOCUMENTS
WO    WO 02/19058 A2    3/2002

OTHER PUBLICATIONS

Strehl, Relationship-based clustering and visualization for high-dimensional data mining, INFORMS, journal on Computing, Linthicum, Spring 2003, vol. 15, Iss. 2, p. 208, downloaded from ProQuest Direct on the Internet on Feb. 22, 2010.*

(Continued)

*Primary Examiner* — James Zurita
(74) *Attorney, Agent, or Firm* — Norman R. Van Treeck, Esq.; Sheldon Mak & Anderson PC

(57) ABSTRACT

A computer-implemented method for graphically displaying media buying options (4) is disclosed. In one embodiment, the method includes receiving a cost attribute and an exposure attribute for each media buying option and displaying a plot (1) of available media buying options (4), wherein the media buying options (4) are plotted against a first axis (1B) corresponding to said cost attribute and a second axis (1A) corresponding to said exposure attribute. In another embodiment the method includes calculating or retrieving from memory two or three attributes of each media buying option (4) to be displayed and graphically plotting in a plot (1) each media buying option (4) against said two or three attributes, wherein at least one of said attributes is an exposure attribute and updating the plot when a variable affecting the value of the exposure attribute of one or more media buying options (4) is changed.

32 Claims, 7 Drawing Sheets

OTHER PUBLICATIONS

Strehl, Relationship-based clustering and cluster ensembles for high-dimensional data ming, Univerty of Texas at Austin, PhD dissertation, 2002. Notice downloaded from ProQuest Direct on the Internet on Feb. 22, 2010, 2 pages.*

Stella So, Accounting Auditing and Accountability Journal, Bradford 2002, vol. 15, Iss. 4, p. 565. Downloaded from ProQuest Direct on the Internet on Feb. 20, 2010, 27 pages.*

Atul Phadnis, *Let There Be Optimisers*, May 2, 2003, http://web.archive.org/web/20030502181353/www.tamindia.com/optimiser1.htm, pp. 1-4.

*Conference Transcript: Modern Concepts in Media: Optimizers*, Oct. 1998 http://www.tvb.org/events/transcripts/981014/981014-opt.asp, pp. 1-20.

De Maeyer et al., I*nteractive Media Planning*, Aug. 2002 http:///www.columbia.edu/~rk35/media_optimizer_2003.pdf, pp. 1-43.

* cited by examiner

Figure 3

Visual Optimiser Display Parameters

Time: 1000-2229
Days: All Days
Channels: TV1
Week Commencing: 06/07/03
Demographic group: All 05+

Programmes avail. 169

Schedule Objectives (301)

Reach target  Single Frequency Target
50 %  ○  1 +

Reach Corridor
●  2 — 5

Budget Limit  $ 250,000

Pre-filter programme selection (optional)
Minimum TARP  1.0
Maximum CPT  750.0

Start Time 1000
End Time 2229

SUN
MON
TUE
WED
THU
FRI
SAT

All | Mid | End

R&F in the selected time period(s)  (302)
01 Jun 2003 - 07 Jun 2003
25 May 2003 - 31 May 2003
18 May 2003 - 24 May 2003
11 May 2003 - 17 May 2003
04 May 2003 - 10 May 2003
27 Apr 2003 - 03 May 2003
20 Apr 2003 - 26 Apr 2003

4 date ranges selected

OK   Cancel

METHOD AND APPARATUS FOR MEDIA BUYING

CROSS-REFERENCE TO RELATED APPLICATIONS

The present Application is a United States national phase application of International Patent Application No. PCT/NZ2004/000183, titled "Method and Apparatus for Media Buying," filed Aug. 12, 2004, which claims priority from New Zealand Patent Application No. 527578 filed Aug. 12, 2003; the contents of which are incorporated in this disclosure by reference in their entirety.

TECHNICAL FIELD

This invention relates generally to a method and apparatus for media buying and in particular, but not exclusively to apparatus for assisting a media buyer to identify media buying options to buy and a method for selecting media buying options in order to achieve one or more goals/targets.

BACKGROUND

At present, when a media buyer is selecting media buying options, the selection may be performed manually with the assistance of a computer. The computer has access to a computer memory, which stores details regarding each media buying option, including its time or location, its cost and one or more measures of the exposure achieved by advertising using the media buying option. The details identifying the media buying option and its cost may be provided by the media supplier, whereas typically the measure(s) of the exposure of the media buying options are provided by a media research company.

One existing method for a media buyer to select media buying options is to display all the media buying options in a list. The list may be able to be sorted by, for example, start time or by a measure of cost or cost against benefit. One or more filters could be applied to the list, filtering out media buying options that do not meet certain criteria, such as availability, programme desirability, or any other filter criteria required by the media buyer.

Alternatively, or in addition, the computer may be operable to display the media buying options in a two dimensional schedule. The schedule may have a vertical axis delimiting a time scale and a horizontal axis delimiting days of the week, or channels currently being analyzed. This way, a media buying option, such as a television programme, is depicted in the schedule as a cell, with a height proportional to the duration of the programme. Information could be provided in the cells or be accessible by linking through the cells. The information provided may include at least one variable defining the exposure of the media buying option.

In a third alternative, the media buyer may utilise an automated optimiser. This involves inputting a set of criteria to the automated optimiser, which then evaluates the available media buying options and makes a selection, subject to filtering and other criteria. Typically, the automated optimiser is told to select the media buying options that have a maximum exposure to cost ratio.

A disadvantage of automated optimisers is that the user often is unaware of the methods used to select programs. Also, there is often limited capability for customising the resulting set of media buying options that are selected. While the combination of a manual method and an automated method may be used, this is time consuming and the manual methods may not be particularly suited to obtaining an optimum mix of media buying options.

It is therefore an object of the present invention to provide a method and/or apparatus for media buying that overcomes or alleviates problems in such at present, or at least to provide the public with a useful alternative.

DEFINITIONS

Throughout this specification and the accompanying claims, the term "media" has been used in a broad sense so as to include, without limitation, television, radio, cinema, printed publications, outdoor advertising spots and/or internet web pages. Accordingly, unless specifically stated otherwise, the term "media buying option" means a unit of media that can be purchased, with the unit depending on the particular type of media under consideration and the preferred or required quantity of that media that represents one unit for purchase.

There are various measures for exposure of media buying options, which depend on the type of media and the available statistical information to form measures of exposure. Taking for example television as the medium, some commonly used measures of exposure and exposure targets are:

Reach: Overall reach is the percentage or number of a target audience to see an advertisement at least once. For example, if half of the desired target audience saw an advertisement, the campaign reach was 50%. 1+ reach is the same as overall reach. Reach can also be measured at different levels of frequency. For example, 2+ reach is the percentage of a target audience who saw an advertisement at least twice.

Target Audience Rating Points (TARPs): Also known as Rating, Average Audience or GRP (Gross Rating Points). The TARPs measure for individual spots/quarter hours is the percentage of the target audience viewing a channel at that time. For example, if 12% of a target audience is viewing a channel then it is achieving 12 TARPS. TARP on several spots in a schedule may be calculated by adding the TARPs for each spot. For example, if 3 spots are in a schedule and each of them rates a 12, the schedule achieves 36 TARPs in total.

Frequency: Average frequency is the typical number of times an advertisement was seen by a person. Average frequency may be calculated by dividing total campaign ratings (TARPs) by the overall reach. For example, 200 TARPs might be needed to reach half of the target audience. The average frequency is 200 (ratings) divided by 50 (overall reach) =4.0 times.

Cost per TARP (CPT): is the cost of a media buying option divided by its TARP value and is a measure of cost efficiency.

Reach Corridor: Exposure Targets are often expressed in terms of a reach corridor. An example of a reach corridor is: Reach 50% 2-5 times. This means that 50% of the target audience saw the particular advertisement between 2 and 5 times.

SUMMARY OF THE INVENTION

According to a first aspect of the present invention, there is provided a computer-implemented method for graphically displaying media buying options, the method including receiving a cost attribute and an exposure attribute for each media buying option and displaying a plot of available media buying options, wherein the media buying options are plotted against a first axis corresponding to said cost attribute and a second axis corresponding to said exposure attribute.

Preferably, the step of displaying a plot of available media buying options includes evaluating a set of media buying options against filter criteria and displaying only the media buying options that satisfy the filter criteria.

Preferably, the method includes providing on the display an indicator of the media buying option or options that maximise or minimise the absolute value of the exposure attribute per unit cost over a range of cost for the available media buying options. The indicator may be a line or band in the plot showing the outer limit of media buying options that maximise or minimise the absolute value of the exposure attribute per unit cost. The method may further include forming the line or band so as to have only a positive or a negative gradient along substantially the entire length of the line or band. Alternatively, the line or band may be calculated and plotted as an average of a group of options that maximise or minimise the absolute value of the exposure attribute per unit cost for each of a plurality of segments of the plot. In one embodiment, the indicator shows the media buying option or options that maximise the absolute value of the exposure attribute per unit cost.

Preferably, the method may further include allowing a user to select media buying options displayed in the plot. The method may still further include displaying a total cost of all previously selected media buying options and may further include displaying at least one total exposure attribute for all previously selected media buying options.

Preferably, the method further includes allowing a user to select media buying options displayed in the plot by directly selecting a media buying option within the plot.

Preferably, the method further includes allowing a user to select the metric used as the exposure attribute for the media buying options.

Preferably, the method includes differentiating in said plot any media purchase options that have been previously selected from those that have not been selected. When repeat purchases of a media buying option are possible, the method may include identifying in said plot the number of times each media buying option has been selected. The method may further include identifying in said plot the number of times each media buying option has been selected by displaying each media buying option as a number in said plot, the number indicating the number of times that media buying options has been selected.

Preferably, the method includes providing an option for the user to display, in a second plot having a first axis corresponding to or related to said cost attribute and a second axis corresponding to or related to said exposure attribute only previously selected media purchase options. Media buying options plotted in the second plot may be plotted by the negative of their cost and/or exposure attributes. The method may further include providing on the display an indicator of the media buying option or options that maximise or minimise the absolute value of the exposure attribute per unit cost over a range of cost for the available media buying options.

According to a second aspect of the invention, there is provided apparatus for graphically displaying media buying options, the apparatus including a computer operable to read either a local or remote computer memory containing one or more cost attributes and exposure attributes for each of a plurality of media buying options and cause to be displayed, on a computer display a plot of available media buying options, wherein the media buying options are plotted against a first axis corresponding to their respective cost attribute and a second axis corresponding to their respective exposure attribute.

Preferably, the apparatus is operable to evaluate a set of media buying options identified by data in said computer memory against filter criteria and displaying only the media buying options that satisfy the filter criteria.

Preferably, the computer computes and causes to be displayed an indicator of the media buying option or options that maximise or minimise the absolute value of the exposure attribute per unit cost over the range of cost for the available media buying options. The indicator may be a line or band showing the outer limit of media buying options that maximise or minimise the exposure attribute per unit cost. The line or band may be computed so as to have only one or a positive or a negative gradient along substantially the entire length of the line or band.

Preferably, when repeat purchases of a media buying option are possible, the computer causes each media buying option to be plotted so as to indicate the number of times that that media buying option has been selected.

Preferably, the computer is further operable to cause a second plot to be displayed having a first axis corresponding to or relating to said cost attribute and a second axis corresponding to or relating to said exposure attribute and plot in said second plot only previously selected media buying options. The computer may be operable to plot the media buying options in the second plot according to the negative of their cost and/or exposure attributes. The computer may be operable to, for the second plot, compute and display an indicator of the media buying option or options that minimise the exposure attribute per unit cost over the range of cost for the available media buying options. The indicator of the media buying option or options that minimise the absolute value of the exposure attribute per unit cost may be a line or band drawn through the plot. In one embodiment, the line or band is an average of the options that minimise the exposure attribute per unit cost for each of a plurality of segments of the plot.

According to a third aspect of the invention, there is provided a computer-implemented method for graphically displaying media buying options, the method including:

a) calculating or retrieving from memory two or three attributes of each media buying option to be displayed and graphically plotting in a plot each media buying option against said two or three attributes, wherein at least one of said attributes is an exposure attribute;

b) recalculating the exposure attribute or retrieving a new exposure attribute and updating the plot at least when a variable affecting the value of the exposure attribute of one or more media buying options is changed.

Preferably, the method includes performing step b) when a media buying option is selected or deselected for purchase.

Preferably, the method includes performing step b) when parameters that affect what media buying options are to be displayed are varied.

Preferably, the method includes differentiating in said plot any media purchase options that have been previously selected from those that have not been selected.

Preferably, when repeat purchases of a media buying option are possible, the method includes identifying in said plot the number of times each media buying option has been selected. The method may include identifying in said plot the number of times each media buying option has been selected by displaying each media buying option as a number in said plot, the number indicating the number of times that media buying options has been selected.

Preferably, the method includes providing an option for the user to display, in a second plot, only previously selected media purchase options. Media buying options plotted in the second plot may be plotted by the negative of their cost and/or exposure attributes. The method may include providing in the second plot an indicator of the media buying option or options that maximise or minimise the absolute value of the exposure attribute per unit cost over a range of cost for the available media buying options.

Preferably, one of the attributes is a cost attribute.

According to a fourth aspect of the present invention, there is provided apparatus for graphically displaying media buying options including a computer operable to:
a) calculate or retrieve from memory two or three attributes of each media buying option and graphically plotting each media buying option against said two or three attributes, wherein at least one of said attributes is an exposure attribute;
b) recalculate the exposure attribute and updating the plot when a variable affecting the value of the exposure attribute of one or more media buying options is changed.

Preferably, the computer performs step b) when a media buying option is selected or deselected for purchase.

Preferably, the computer is operable to cause to be displayed, in a second plot against an exposure attribute and one or two other attributes, only any previously selected media purchase options. Media buying options plotted in the second plot may be plotted by the negative of their cost and/or exposure attributes. The second plot may include an indicator of the media buying option or options that maximise or minimise the absolute value of the exposure attribute per unit cost over a range of cost for the available media buying options.

Preferably, one of said attributes is a cost attribute.

Further aspects of the present invention may become apparent from the following description, given by way of example of preferred embodiments only and with reference to the accompanying drawings.

BRIEF DESCRIPTION OF THE DRAWINGS

FIG. 3: shows a target selection screen for setting targets for selection of media buying options.

DETAILED DESCRIPTION OF THE INVENTION

The present invention relates to a method and apparatus for assisting the selection of media buying options. The invention, in broad terms, includes displaying the media buying options to a media buyer as a plot against a cost attribute and an exposure attribute. This may allow the media buyer to use visual inspection to identify the media buying options for selection (or deselection).

The present invention may have particular application to the purchase of television time slots for advertising, however the invention is not limited to this application.

Figure 1:
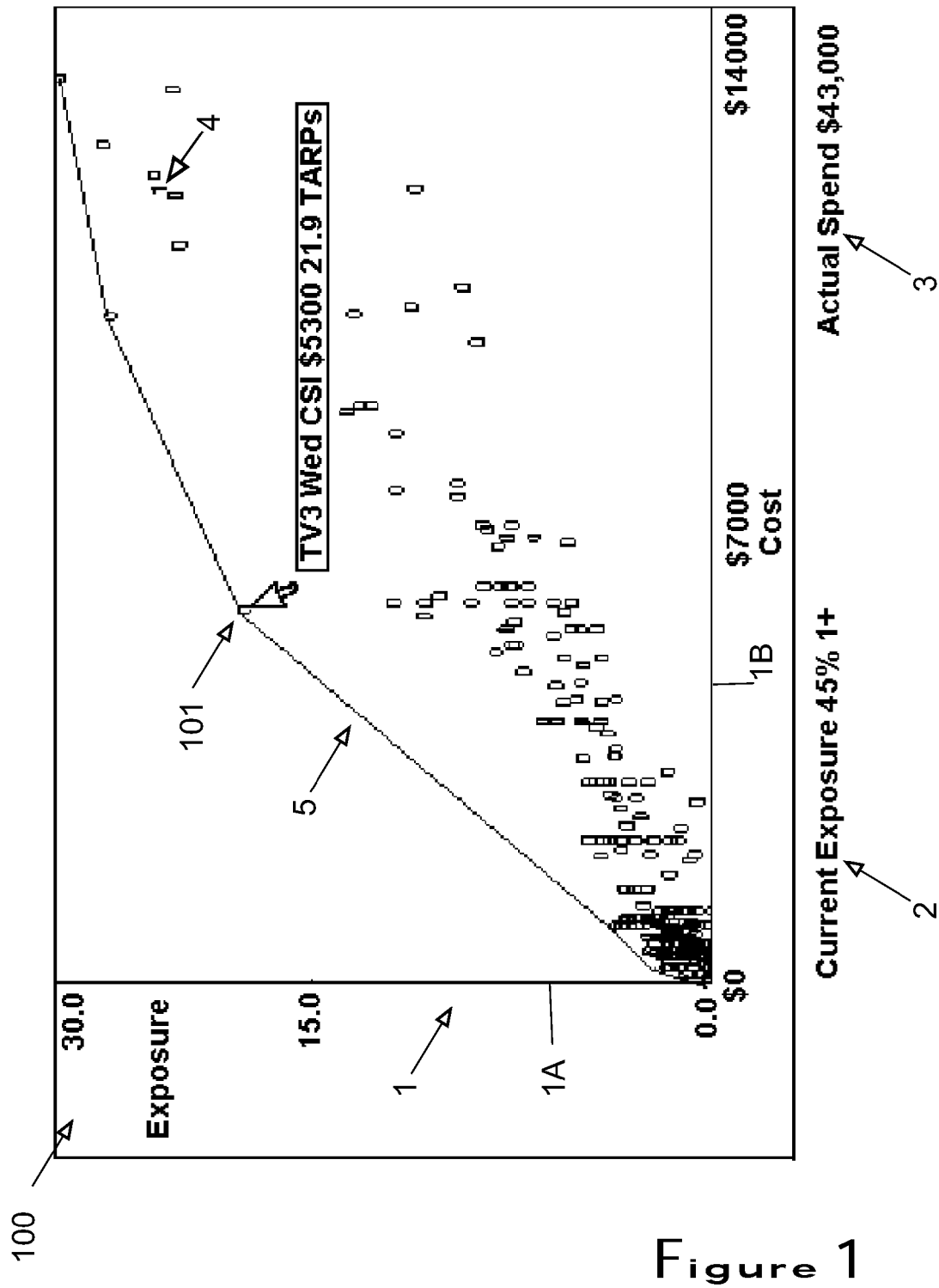
FIG. 1: shows a display of a plot of media buying options according to one aspect of the present invention.

FIG. 1, shows an example of a screen display referenced by arrow 100, which in one embodiment, may result from the method and apparatus of the present invention. The screen display 100 is displayed as part of a graphical user interface (GUI) presented by a computer system, which may be a personal computer with access to a computer memory containing information on each media buying option to be considered. The computer memory may be local, for example the hard disk of the personal computer or a compact disc, or may be remote, for example on a database accessible through a local or wide area network. In addition, the screen display 100 may be caused to be displayed on a screen that is remote from the computer (which may be, for example a plurality of networked computers, a suitable server, or dedicated hardware). In this embodiment, the user may interact with the GUI through a point and click device, suitably a mouse. A pointer 101 for the point and click device is shown in FIG. 1. The screen display 100 includes a plot 1, including two axes 1A and 1B, against which media buying options are plotted.

In FIG. 1, the media buying options are represented in the plot 1 either by zeros or a number. The significance of the number displayed is explained herein below. In the example shown in FIG. 1, the axis 1A is a measure of incremental exposure that each media buying option provides. The exposure may be measured in any suitable metric, including, for example, target audience rating points (TARPS), 1+ reach, 2+ reach, reach against a 2-5+ corridor or any other required exposure metric and may represent a combination of exposure attributes. The axis 1B is a value of the incremental cost of each media buying option. In another embodiment, the axes 1A and 1B may be reversed and in a further alternative embodiment one or both of the axis values may be represented as negative values, showing the outflow of money required to purchase each option and/or the exposure not obtained by not selecting an option. However, the preferred form of the plot 1 is shown in FIG. 1.

When the pointer 101 is moved over a plotted media buying option, details of the media buying option may be automatically displayed. The information displayed for a media buying option may include, but is not limited to, its channel, day of the week and time, cost and its exposure value. An option to select a media buying option for purchase may be accessible through a menu displayed by clicking a button on the point and click device. The media buyer may access further information by selecting the media buying option, for example by double-clicking on the plotted media buying option, after which a new screen (not shown) may be displayed that shows details relating to the media buying option and provides an option allowing a media buying option to be selected for purchase, suitably a "purchase" icon. The media buyer may have to drill down to obtain more specific information regarding each media buying option.

In one embodiment, after a media buying option has been selected for potential purchase, its display on the plot may change. For example, in FIG. 1, one of the media buying options, referenced by arrow 4 is displayed as a "1". This indicates that one spot has already been booked into the schedule for this media buying option. Those skilled in the relevant arts will appreciate that multiple selections and purchases may be made of a single media buying option where the time period or other resource is sufficiently long to cover multiple time slots for that media buying option, or where the advertising medium is separated into sections, with each section being available for purchase. Taking for example the purchase of television time slots, the plot 1 may display all the media buying options over several weeks, with the media buyer having an option of purchasing a particular media buying option for one week, or two or more weeks. If two slots are selected for purchase, a "2" may be displayed in the plot 1 as the representation for that media buying option. Alternative methods of distinguishing selected media buying options may be used, for example using colour codes, different shapes, or otherwise. However, displaying a number may be preferred due to avoiding having to remember any correlation between the indicator used and the number of selections.

If a metric for the exposure attribute is reach or another metric that is not a simple ratings measure or similar metric, then the incremental benefit of purchasing multiple slots in a particular media buying option generally decreases with each media buying option purchased. This is because substantially the same viewers will tend to see the advertisement each time it is broadcast (or otherwise displayed if another medium is used). Similarly, the incremental benefit of purchasing other media buying options having a similar audience generally decreases for the same reason.

Therefore, in one embodiment of the present invention, where an exposure attribute like reach is used, the exposure attribute is recalculated and the plot updated each time a media buying option is selected. Therefore, every media buying option is displayed according to its additional contribution to the previously selected set of media buying options, rather than according to its exposure value in isolation of any previously selected media buying options. Recalculation and updating of the plot may be particularly advantageous in allowing the media buying option to select the best mix of media buying options.

The screen display 100 may display the current exposure, which is the accumulated exposure obtained from the set of media buying options that have been previously selected and may also display the actual spend, being the amount needed to be spent to purchase the media buying options that have been previously selected. The display of current exposure and actual spend are referenced 2 and 3 respectively in FIG. 1.

A line 5 may be drawn on the plot showing the outer limit of the available media buying options. The line 5 may be computed using any suitable algorithm and may involve, for example iteratively searching for the most cost effective media buying options along the cost axis and plotting the line 5 through the identified media buying options so that the gradient of the line 5 never increases and is never negative. Some relaxation from these requirements may be made by using an alternative algorithm if required. The media buyer would typically first examine the media buying options on or close to the line 5 for selection and purchase, as these represent the best media buying options, measured on a return on investment basis.

Alternative methods of calculating and displaying the line 5 may be used and other lines or indicators may be displayed as well as, or as an alternative to line 5. For example, instead of displaying the line 5, as an outer limit line, a line may be drawn through the average of the top few (for example three) media buying options per segment of an axis. Alternatively, the average may be calculated from those media buying options located in the plot 1 about the media buying options situated on the outer limit line. The outer limit line may be a band, which may be a coloured band, through the top options.

Another line may be drawn through the lower outer limit, perhaps to assist in the identification of media buying options that should be deleted from consideration. Also, alternative methods of indicating the media buying option or options that maximise the ratio of exposure to cost may be used, including for example colour coding the media buying option that has the maximum exposure to cost ratio for each segment of one of the axes of the plot. If the plot 1 is plotted using negative values for the exposure attribute and/or cost, the line 5 would be drawn on the opposing side of the plot. For calculation purposes, the absolute values of the exposure attribute and cost may be used for drawing the line 5.

In the example shown in FIG. 1, both the exposure and cost are displayed in plot 1 incrementally. As an alternative, the total values resulting from selecting the displayed media buying options may be displayed, in which case the value for exposure would range form 45 to 75 and the values for cost would range from 43,000 to 57,000. Also, the cost attribute may be replaced with an exposure attribute if the media buyer can extract useful information by having media buying options plotted against two (or three) exposure attributes.

The display size of the plot 1 may be able to be increased so that the media buyer can more easily view areas of high density, for example the portion at the lower left hand corner of the plot 1. This may be achieved using any suitable technique, for example using a zoom tool or area selection tool.

Figure 2:
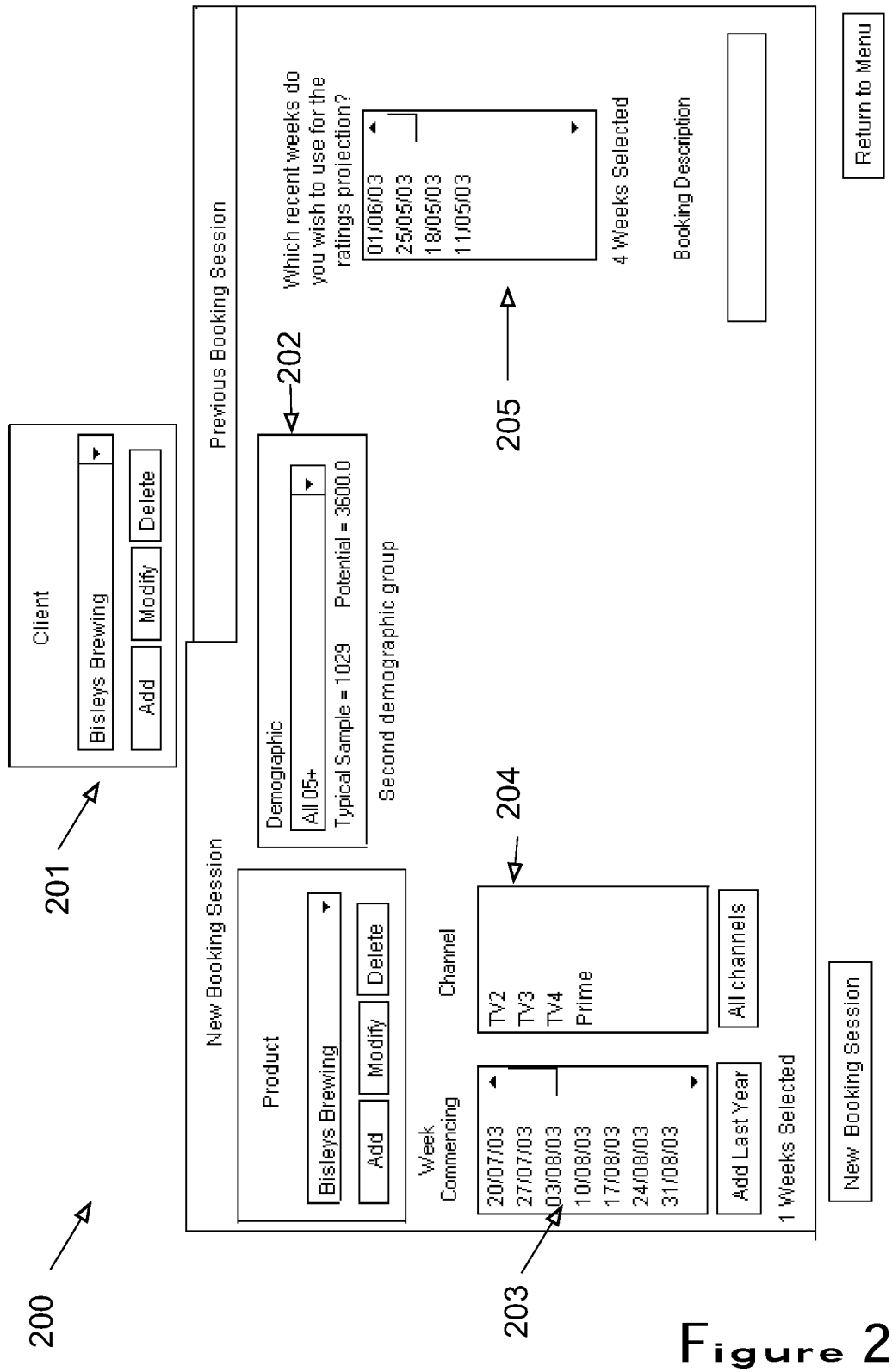
FIG. 2: shows a variable selection screen for setting variables to be used for forming the plot shown in FIG. 1.

Referring now to FIG. 2, a variable input screen generally referenced by arrow 200 is shown. The variable input screen 200 allows input of some of the variables for selecting the media buying options that are to be displayed in the display 100 and for recording each media booking session. In this embodiment, the variable input screen 200 is adapted specifically for purchasing television advertising time slots. The variable input screen 200 allows selection of a client name using a client name field 201, which may be used for saving and retrieving from memory the media booking session for that client. The selection of a client may automatically set some predetermined variable values specific to that client. A demographic field 202 allows for the selection of the target demographic, which typically influences the value for exposure of each media buying option. A time period is selected using a time field 203, which in this embodiment allows selection of time periods in weeks. This field represents one filter criteria that may be applied to select which media buying options to display in the plot 1. A channel selection field 204 allows selection of the channels for which the available media buying options are to be displayed. In addition, variable input screen 200 may have a ratings projection field 205 allowing selection of the historical data to be used to forecast the ratings or other exposure attribute for the time period specified in time field 203.

Those skilled in the relevant arts will appreciate that variable input screen 200 is merely an example of one of many possible different input screens that may be provided, allowing specification of any number of input variables for governing what media buying options are to be plotted in plot 1. The options available will depend on the type(s) of media available and the number of available media buying options per unit of an input variable. Also, all the options need not be displayed on one screen. Provided a compatible measure of exposure is used, media buying options from different media may be displayed on the same plot 1, allowing formation of a portfolio of media buying options. The variable input screen 200 may accordingly allow for the selection of different media.

FIG. 3 shows a target input screen 300. The target input screen shown in this embodiment includes a schedule objectives box 301, which allows the input of a reach target, single frequency target or reach corridor. The budget limit and further filter criteria, in this example minimum TARP and maximum CPT, may also be entered in the schedule objectives box 301. In screen display 100, an indicator may be provided to indicate to the user if the actual spend exceeds the budget limit. For example the actual spend field 3 may change colour if the budget limit is exceeded. Typically, if a 2+ frequency or higher was required, the user would initially set a 1+ frequency target, make selections from plot 1 until the target was achieved, return to target input screen 300, increase the frequency to 2+ or 3+, which would then change the plot 1 and allow further selections to be made to reach the new frequency target. A reach and frequency field 302 allows selection of the time period of historical data used to forecast the contribution that each media buying option makes to reach and frequency, which may not necessarily be the same time period specified in ratings projection field 205.

Again, those skilled in the relevant arts will appreciate that many different target criteria, spending criteria and filter criteria could be specified. The screen displays provided herein are given by way of example of one possible implementation, which has been simplified for clarity to remove many of the additional functions and variables that are typically used by a media buyer.

Figure 4:
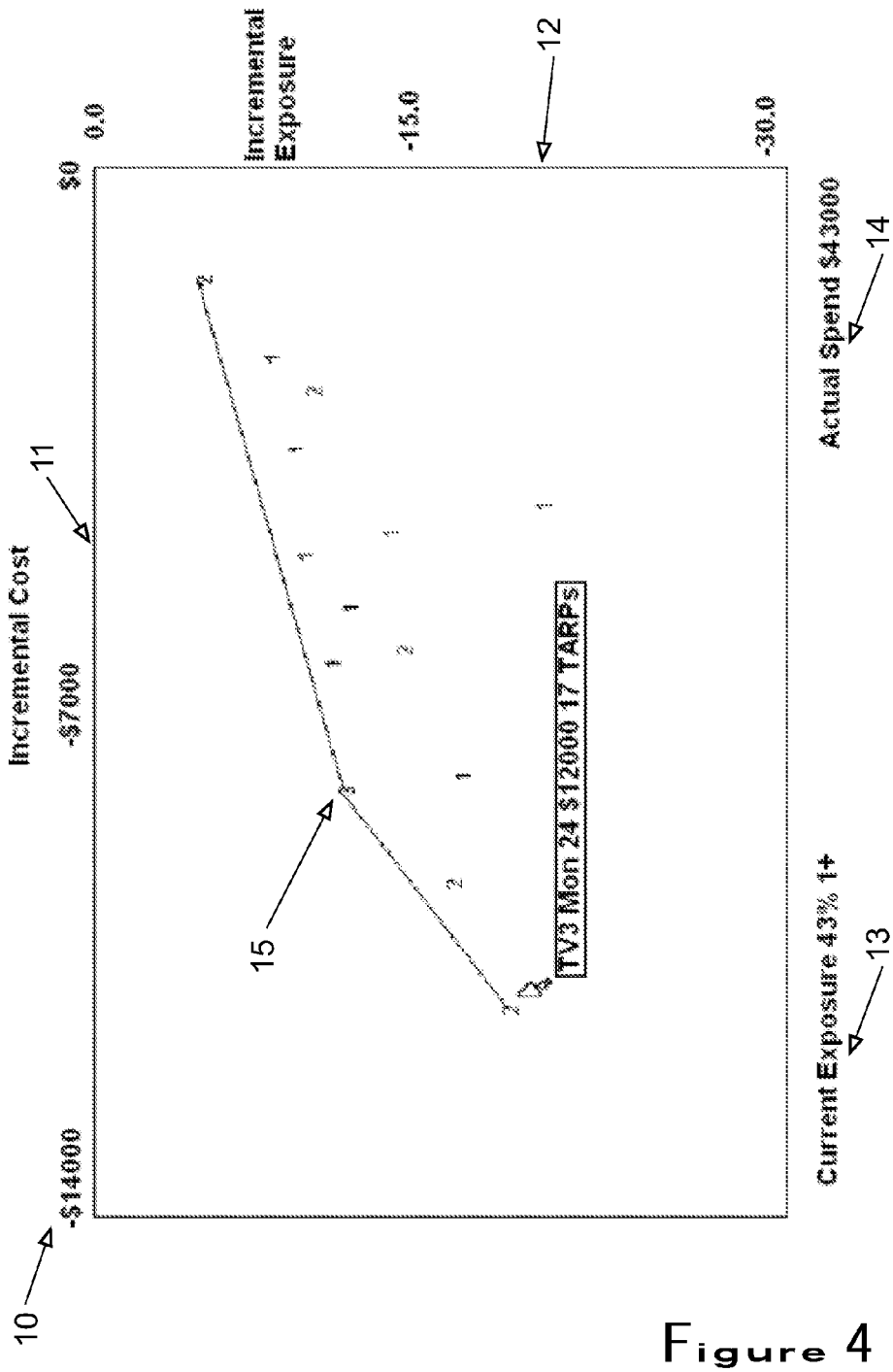
FIG. 4: shows a display of a plot of previously selected media buying options.

FIG. 4 shows a plot 10 of selections that have been made by a media buyer. In this embodiment, the plot 10 shows the negative incremental cost of each media buying option and the associated negative exposure. By formatting the plot 10 in this way, if a media buyer is looking to reduce cost in the most cost effective manner, they would be looking to remove media buying options located towards the upper left hand corner of the plot. This is complimentary to the process followed to select the best value media buying options for selection in plot 1, which are also located towards the top left hand corner of the plot 1.

The plot 10 therefore includes two axes, an incremental cost axis 11 and an incremental exposure axis 12. As with plot 1, the axes 11, 12 may be changed to total values if required, or the axes 11, 12 may relate to the cost and exposure attributes from plot 1 without being identical. As with the plot 1, the user may select one of a plurality of measures of exposure against which to plot each previously selected media buying option. A current exposure field 13 and actual spend field 14 may be displayed with the plot 10 so that the media buyer may have instant access to this information. As plot 10 only plots previously selected media buying options, all plotted media buying options have a number of one or more. Again alternative methods of indicating the number of times a media buying option has been selected may be used.

A line 15 may be plotted as a reference line, showing the outer limit of the highest cost media buying options per unit exposure. The line 15 may be computed in the same or a similar way to the line 5. Typically, the media buyer would first examine the media buying options on or close to this line for culling if reduced spending was required or if some media buying options need to be deselected to allow others to be included in a buying schedule.

In an alternative embodiment, instead of displaying negative values in the plot 10, the same values used in the plot 1 could be used in the plot 10 if required, in which case the line 15 may be plotted on the lower right hand side of the plot 10 instead of the upper left hand side. As with the line 5, there are a number of possible display alternatives to line 15.

As with the plot 1, in one embodiment the incremental exposure of each media buying option may be recalculated every time a media buying option is selected to be removed. The plot 10 may also be recalculated if any other variable affecting the exposure values or the media buying options available for selection is changed.

Figure 5:
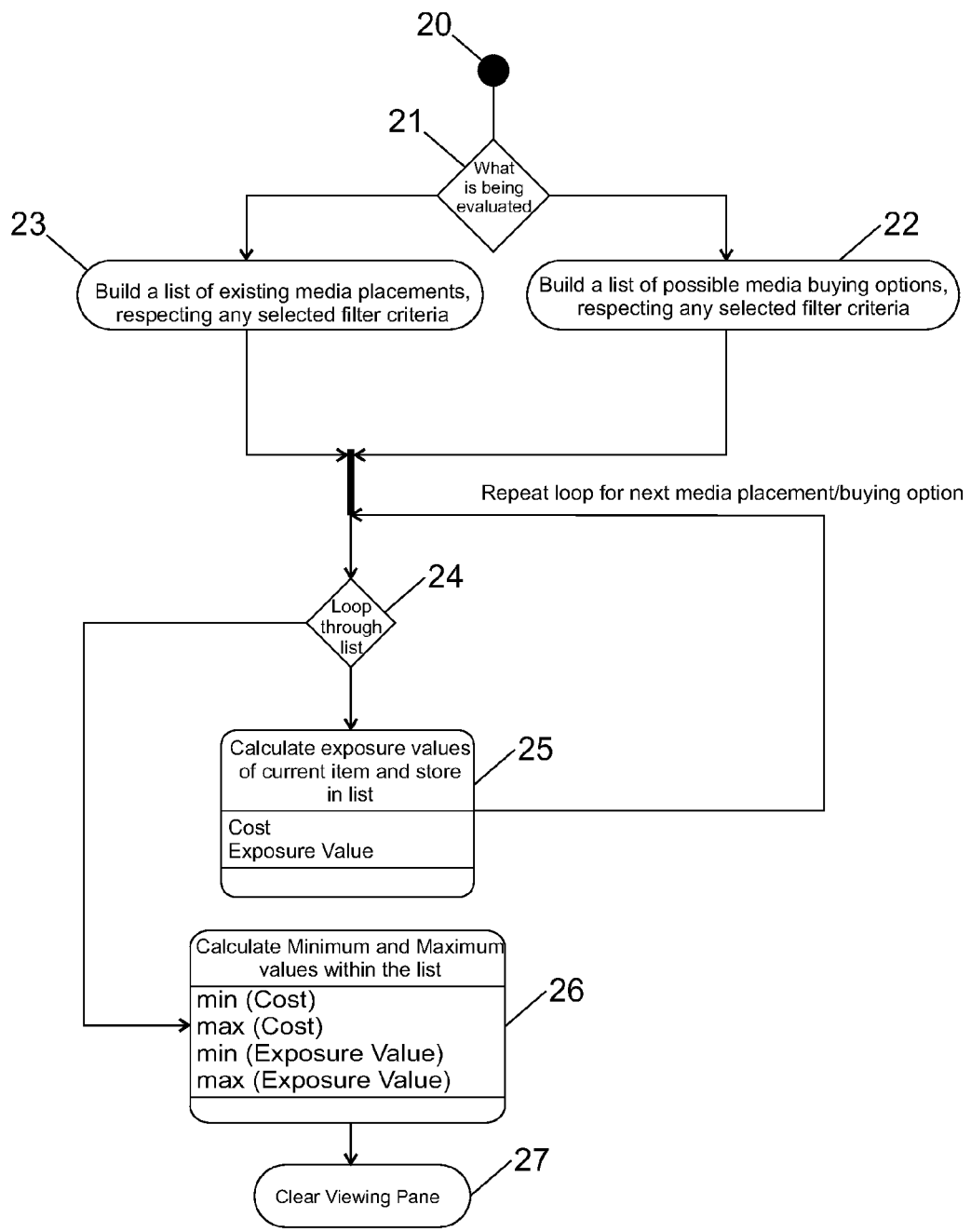
FIG. 5: shows a flow diagram of the main steps performed by a computer to display the plots shown in FIG. 1 and FIG. 4.
Figure 5:
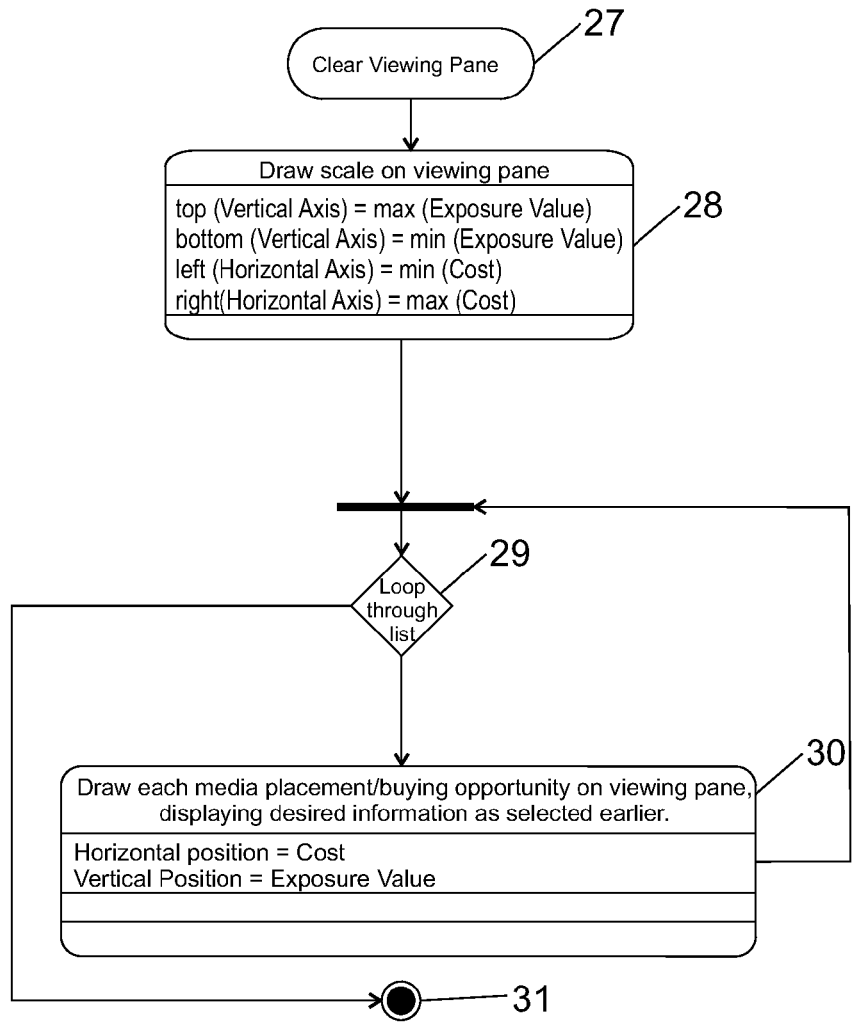

FIG. 5 shows a flow diagram of the main steps taken by a computer to display the plots 1 and 10. The process commences at starting point 20 when the computer will perform any initialization steps required, such as setting counters to zero and identifying and retrieving an existing schedule as identified by a media buyer. In step 21, the computer identifies whether it is building a plot of the type of plot 1 or a plot of the type of plot 10. This information will be entered by a media buyer through a suitable user interface. If a plot is to be the type of plot 1, the computer progresses to step 22, building a list of possible media buying options, respecting any selected filter criteria. The filter criteria would have been entered by the media buyer in a screen such as target input screen 300. If it is an existing schedule, the selections made in a screen such as variable input screen 200 would have already been made. If a media buyer is creating a new schedule, then these would need to be entered prior to performing step 22. If the plot is to be the type of plot 10, the computer will proceed to step 23, in which case it builds a list of existing media buying option selections, respecting any selected filter criteria. The filter criteria may have been changed by the media buyer prior to performing step 23, requiring some existing selections to be deleted and others recalculated when performing step 22.

Step 24 represents a decision block to end a cyclic execution of step 25. The cycling through of step 25 will terminate when every item in the list of media buying options created in step 22 or step 23 has been subjected to step 25. Step 25 involves calculating or retrieving a value for exposure for each media buying option in the list. The exposure value may be any suitable measure and may be selected by the media buyer or alternatively may be fixed.

Step 26 involves calculating the minimum and maximum values for the list, which are used to determine the range of values that the axes of the plot should cover. Step 27 involves clearing the display screen for display of a new plot 1 or 10. The computer in step 28 then displays the axes for the plot 1 or 10 using the values calculated in step 26.

Step 29 terminates a loop through step 30 and terminates the loop when all media buying options in the list formed in step 22 or step 23 have been plotted in the plot 1 or 10. Step 30 involves plotting each media buying option in the plot 1 or 10 and the process terminates at step 31. Additional steps are performed to plot the line 5 and line 15, those steps being readily apparent to those skilled in the relevant arts.

The process shown in FIG. 5 is repeated, refreshing the display any time that a new plot needs to be displayed. A recalculation and a new plot may be required if any variables that affect the incremental contribution to the exposure attribute are changed and a new plot may be required if the user selects a different display option or different filtering criteria. For example the media buyer may change the filter criteria using the schedule objectives box 301, change the available time period in which the media purchase options are located, change the historical data used to forecast the exposure attribute, make or remove a selection of a media buying option, or change the metric of the exposure attribute.

The recalculation and drawing of a new plot may be performed for plots that have axes other than an exposure attribute against cost. For example, a plot of TARP against REACH may be displayed or any other variables used as required. The variables selected will depend on what the media buyer views as useful and from which the media buyer can visually perceive the media buying options to select (or deselect).

In one embodiment, the plot 600 may have three axes. For example, the plot may show TARP 601 against reach 602 and cost 603. In this embodiment, if an indicator is plotted showing the outer limit of options that maximise (or minimise) one or a combination of TARP and reach per unit cost, this indicator may be in the form of a surface 604 as shown.

Figure 6:
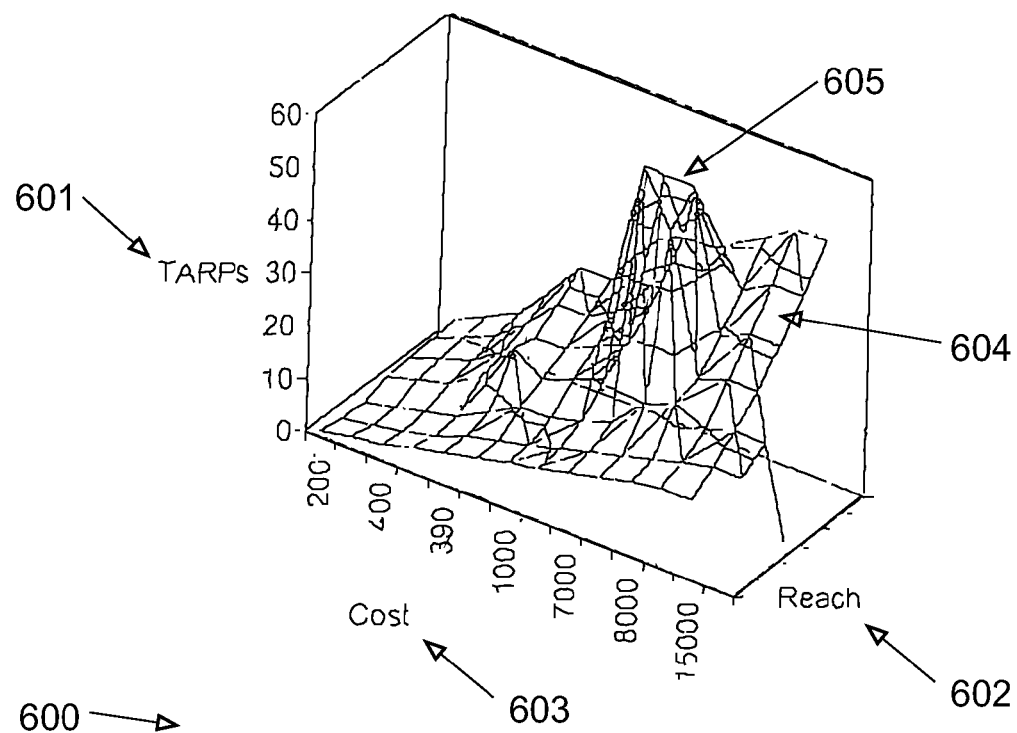
FIG. 6: shows an example of a three dimensional plot according to an aspect of the present invention.

FIG. 6 shows an example three-dimensional plot 600 of TARP 601 against reach 602 and cost 603. In this example there is a local maximum represented by the peak 605 in the surface plot. Media buying options located around this point show an abnormally high TARP level for the given cost and reach. In order for the user to fully understand plots in more than two dimensions, the user may be provided with controls which would allow the surface plot to be rotated about any axis. This enables the user to view the data from any perspective and more easily find peaks and troughs. In this representation the ideal spots are located towards the top left corner of the plot.

In one embodiment, the computer may perform an automated selection process, optimising the selection based on its criteria and then display plot 1 and plot 10 to the media buyer to allow manual adjustment of the selection. In this way a time efficient mix of automated and manual selection may be achieved.

Where in the following description reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A computer-implemented method for graphically displaying media buying options, the method comprising a computer operable for:
   reading a computer memory containing an exposure attribute and at least one remaining attribute for each of a plurality of media buying options;
   determining an exposure attribute and at least one remaining attributes of each media buying option to be displayed;
   displaying a plot of available media buying options, wherein the media buying options are plotted against a first axis corresponding to the exposure attribute and a second axis corresponding to at least one of the remaining attributes;
   in response to a displayed media buying option being selected or deselected for purchase, recalculating the exposure attribute for each media buying option to account for the exposure of the selected or deselected media buying option, and;
   displaying a new plot of the media buying options comprising the recalculated exposure attribute.

2. The method of claim 1, wherein displaying a plot of available media buying options includes evaluating a set of media buying options against filter criteria and displaying only the media buying options that satisfy the filter criteria.

3. The method of either claim 1 or claim 2, wherein the at least one remaining attribute is a cost attribute and the method includes providing on the display an indicator of the media buying option or options that maximize or minimize the absolute value of the exposure attribute per unit cost over a range of cost for the available media buying options.

4. The method of claim 3, wherein the indicator is a line or band in the plot showing the outer limit of media buying options that maximize or minimize the absolute value of the exposure attribute per unit cost.

5. The method of claim 4, comprising forming the line or band so as to have only a positive or a negative gradient along substantially the entire length of the line or band.

6. The method of claim 4, wherein the line or band is calculated and plotted as an average of a group of options that maximize or minimize the absolute value of the exposure attribute per unit cost for each of a plurality of segments of the plot.

7. The method of claim 3, wherein the indicator shows the media buying option or options that maximize the absolute value of the exposure attribute per unit cost.

8. The method of claim 3, further comprising displaying a total cost of all previously selected media buying options.

9. The method of claim 3, comprising providing an option for the user to display, in a second plot having a first axis corresponding to or related to the cost attribute and a second axis corresponding to or related to the exposure attribute only previously selected media purchase options.

10. The method of claim 9, wherein media buying options plotted in the second plot are plotted by the negative of their cost or exposure attributes, or by both the negative of their cost and exposure attributes.

11. The method of claim 10, comprising providing on the display an indicator of the media buying option or options that maximize or minimize the absolute value of the exposure attribute per unit cost over a range of cost for the available media buying options.

12. The method of claim 9, comprising providing on the display an indicator of the media buying option or options that maximize or minimize the absolute value of the exposure attribute per unit cost over a range of cost for the available media buying options.

13. The method of claim 1, further comprising displaying at least one total exposure attribute for all previously selected media buying options.

14. The method of claim 1, further comprising allowing a user to select media buying options displayed in the plot by directly selecting a media buying option within the plot.

15. The method of claim 1, further comprising allowing a user to select the metric used as the exposure attribute for the media buying options.

16. The method of claim 1, comprising differentiating in the plot any media purchase options that have been previously selected from those that have not been selected.

17. The method of claim 16, wherein when repeat purchases of a media buying option are possible, the method includes identifying in the plot the number of times each media buying option has been selected.

18. The method of claim 17, further comprising identifying in the plot the number of times each media buying option has been selected by displaying each media buying option as a number in the plot, the number indicating the number of times that media buying options has been selected.

19. The method of claim 1, further comprising allowing a user to select a plotted media buying option and displaying information about a media buying option when it is selected.

20. The method of claim 1, wherein displaying a plot of available media buying options comprises displaying media buying options for a radio broadcasting business.

21. The method of claim 1, wherein displaying a plot of available media buying options comprises displaying media buying options for a television broadcasting business.

22. An apparatus for graphically displaying media buying options, the apparatus comprising a computer operable to:
   read a computer memory containing an exposure attribute and at least one remaining attribute for each of a plurality of media buying options; cause to be displayed, on a computer display a plot of available media buying options, wherein the media buying options are plotted against a first axis corresponding to the exposure attribute and a second axis corresponding to the at least one remaining attribute;
   allow a displayed media buying option to be selected or deselected for purchase;
   recalculate the exposure attribute for each media buying option to account for the exposure of the selected or deselected media buying option in response to a displayed media buying option being selected or deselected for purchase, and;

display a new plot of the media buying options comprising the recalculated exposure attribute.

23. The apparatus of claim 22, operable to evaluate a set of media buying options identified by data in the computer memory against filter criteria and displaying only the media buying options that satisfy the filter criteria.

24. The apparatus of claim 22, wherein the at least one remaining attribute is a cost attribute and the computer computes and causes to be displayed an indicator of the media buying option or options that maximize or minimize the absolute value of the exposure attribute per unit cost over the range of cost for the available media buying options.

25. The apparatus of claim 24, wherein the indicator is a line or band showing the outer limit of media buying options that maximize or minimize the exposure attribute per unit cost.

26. The apparatus of claim 25, wherein the line or band is computed so as to have only a positive or a negative gradient along substantially the entire length of the line or band.

27. The apparatus of claim 24, wherein the computer is further operable to display a second plot having a first axis corresponding to or relating to the cost attribute and a second axis corresponding to or relating to the exposure attribute and plot in the second plot only previously selected media buying options.

28. The apparatus of claim 27, wherein the computer is operable to plot the media buying options in the second plot according to the negative of their cost or exposure attributes, or by both the negative of their cost and exposure attributes.

29. The apparatus of claim 27, wherein the computer is operable to, for the second plot, compute and display an indicator of the media buying option or options that minimize the exposure attribute per unit cost over the range of cost for the available media buying options.

30. The apparatus of claim 29, wherein the indicator of the media buying option or options that minimize the absolute value of the exposure attribute per unit cost is a line or band drawn through the plot.

31. The apparatus of claim 30, wherein the line or band is an average of the options that minimize the exposure attribute per unit cost for each of a plurality of segments of the plot.

32. The apparatus of claim 22, wherein when repeat purchases of a media buying option are possible, the computer causes each media buying option to be plotted so as to indicate the number of times that that media buying option has been selected.

* * * * *